United States Patent
Reams (10) Patent No.: US 9,007,928 B2
(45) Date of Patent: Apr. 14, 2015

(54) MESSAGE ACKNOWLEDGMENT BASED UPON COMMUNICATION QUALITY

(75) Inventor: William Reams, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 956 days.

(21) Appl. No.: 12/974,220

(22) Filed: Dec. 21, 2010

(65) Prior Publication Data

US 2012/0155299 A1 Jun. 21, 2012

(51) Int. Cl.
| | |
|---|---|
| *H04L 12/26* | (2006.01) |
| *H04W 4/00* | (2009.01) |
| *H04L 1/18* | (2006.01) |
| *H04L 1/14* | (2006.01) |
| *H04L 1/16* | (2006.01) |

(52) U.S. Cl.
CPC ............... *H04L 1/1825* (2013.01); *H04L 1/14* (2013.01); *H04L 1/1671* (2013.01); *H04L 1/1685* (2013.01)

(58) Field of Classification Search
USPC ......... 370/328–329, 335, 336, 338, 342, 343, 370/477–480; 714/48–49
See application file for complete search history.

(56) References Cited

U.S. PATENT DOCUMENTS

| | | | |
|---|---|---|---|
| 6,665,522 B1 | 12/2003 | Lundstrom et al. | |
| 7,924,749 B2 * | 4/2011 | Ren et al. | 370/278 |
| 8,254,315 B2 * | 8/2012 | Suzuki et al. | 370/329 |
| 2003/0174662 A1 * | 9/2003 | Malkamaki | 370/310 |
| 2004/0081133 A1 * | 4/2004 | Smavatkul et al. | 370/346 |
| 2004/0153909 A1 * | 8/2004 | Lim et al. | 714/714 |
| 2005/0250512 A1 * | 11/2005 | Zhang et al. | 455/453 |
| 2006/0002350 A1 * | 1/2006 | Behroozi | 370/338 |
| 2006/0227743 A1 * | 10/2006 | Ishimori et al. | 370/331 |
| 2007/0066239 A1 * | 3/2007 | Hart | 455/69 |
| 2008/0165698 A1 * | 7/2008 | Dalsgaard et al. | 370/252 |
| 2011/0103306 A1 * | 5/2011 | Hole et al. | 370/328 |

FOREIGN PATENT DOCUMENTS

WO 0122645 A1 3/2001

OTHER PUBLICATIONS

European Patent Office, International Searching Authority, "International Search Report" mailed Apr. 10, 2012; International Appln. No. PCT/US2011/063569, filed Dec. 6, 2011.

* cited by examiner

*Primary Examiner* — Candal Elpenord
(74) *Attorney, Agent, or Firm* — Ingrassia Fisher & Lorenz, P.C.

(57) ABSTRACT

A method of selectively employing acknowledgment in a communication system is presented herein. In one implementation of the method, at least one indication of a communication quality of a link coupling a first communication node and a second communication node is processed. After processing the indication, a message from the first communication node is transmitted over the link to the second communication node. The message includes an acknowledgment request if the processing of the indication signifies that the communication quality of the link is below a predetermined level. Oppositely, the message does not include an acknowledgment request if the processing of the indication signifies that the communication quality of the link at least attains the predetermined level.

19 Claims, 5 Drawing Sheets

MESSAGE ACKNOWLEDGMENT BASED UPON COMMUNICATION QUALITY

BACKGROUND

Many types of communication systems provide some mechanism for providing the sender or source of a communication some indication as to whether the intended receiver or destination of the communication successfully received the communication. A common mechanism providing such feedback in communication systems involving the transfer and reception of individual communication segments, such as messages or packets, is a response or "acknowledgment" message or signal transmitted to the communication source from the destination that received the original message. An acknowledgment message, or "ACK", indicates that at least one message from the source has been received successfully by the destination transmitting the acknowledgement. In some implementations, the destination may issue a negative acknowledgment message, or "NACK", to the source to signify when an expected message is not received successfully.

Ordinarily, in communication systems in which a source does not transmit a message until the immediately preceding message has been acknowledged, the acknowledgment message need not explicitly identify the original message received. Oppositely, in systems in which multiple messages may be transmitted and outstanding without corresponding acknowledgment messages being received, each acknowledgment for an associated message received successfully may include an indication of which original message is being acknowledged so that the source is cognizant of which of the messages the source has previously transmitted do not require retransmission.

Typically, in response to a lack of an acknowledgment being received from the target within a predetermined period of time, the source may resend to the intended destination the original message corresponding to the missing acknowledgment at least once until an acknowledgment is received, or until a maximum number of retries for sending the original message has been reached.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
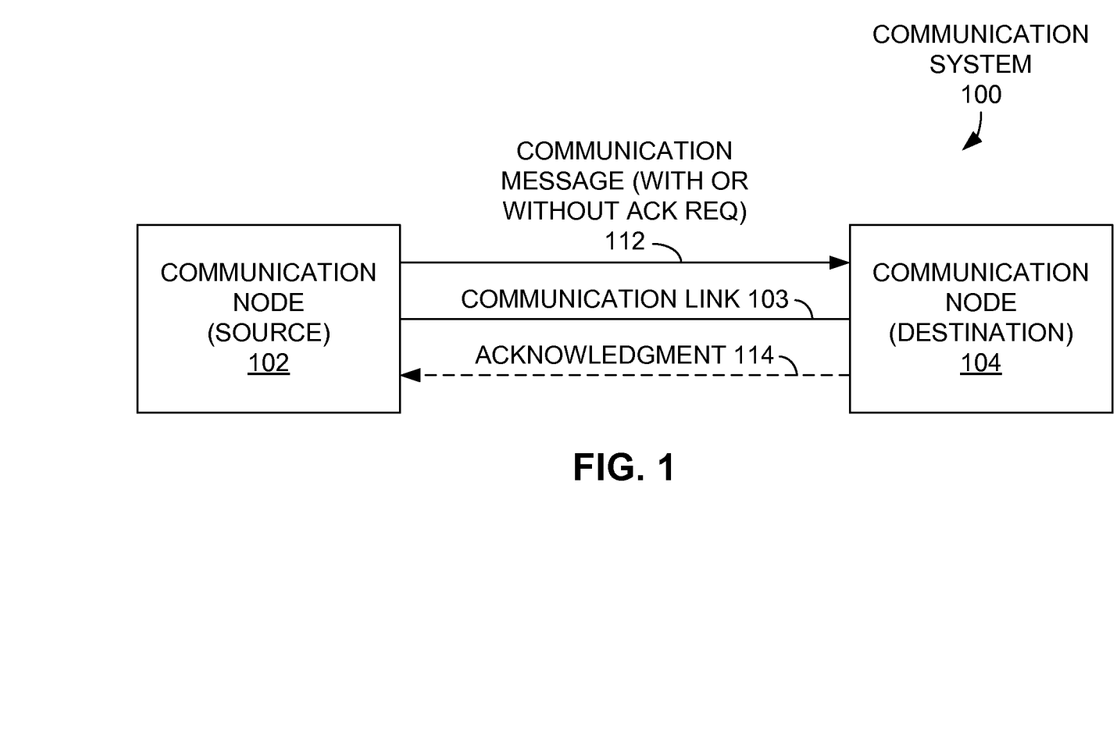
FIG. 1 is a simplified block representation of a communication system according to an embodiment of the invention.

FIG. 1 illustrates a communication system including a first (source) communication node 102 communicatively coupled with a second (destination) communication node 104 according to an embodiment of the invention. While the first communication node 102 is referred to herein as a communication source, and the second communication node 104 is termed a communication destination, such terminology is employed with respect to a particular set of operations described hereinafter. As a result, in some implementations, the second communication node 104 may also serve as a source of communications transferred to the first communication node 102 acting as a destination for those communications.

In more specific embodiments described below, the communication nodes 102, 104 communicate therebetween by way of wireless communication signals, such as radio frequency (RF) or infrared (IR) communication signals. However, wired or other physical communication links may serve as the communication medium between the communication nodes 102, 104 in other examples.

Figure 2:
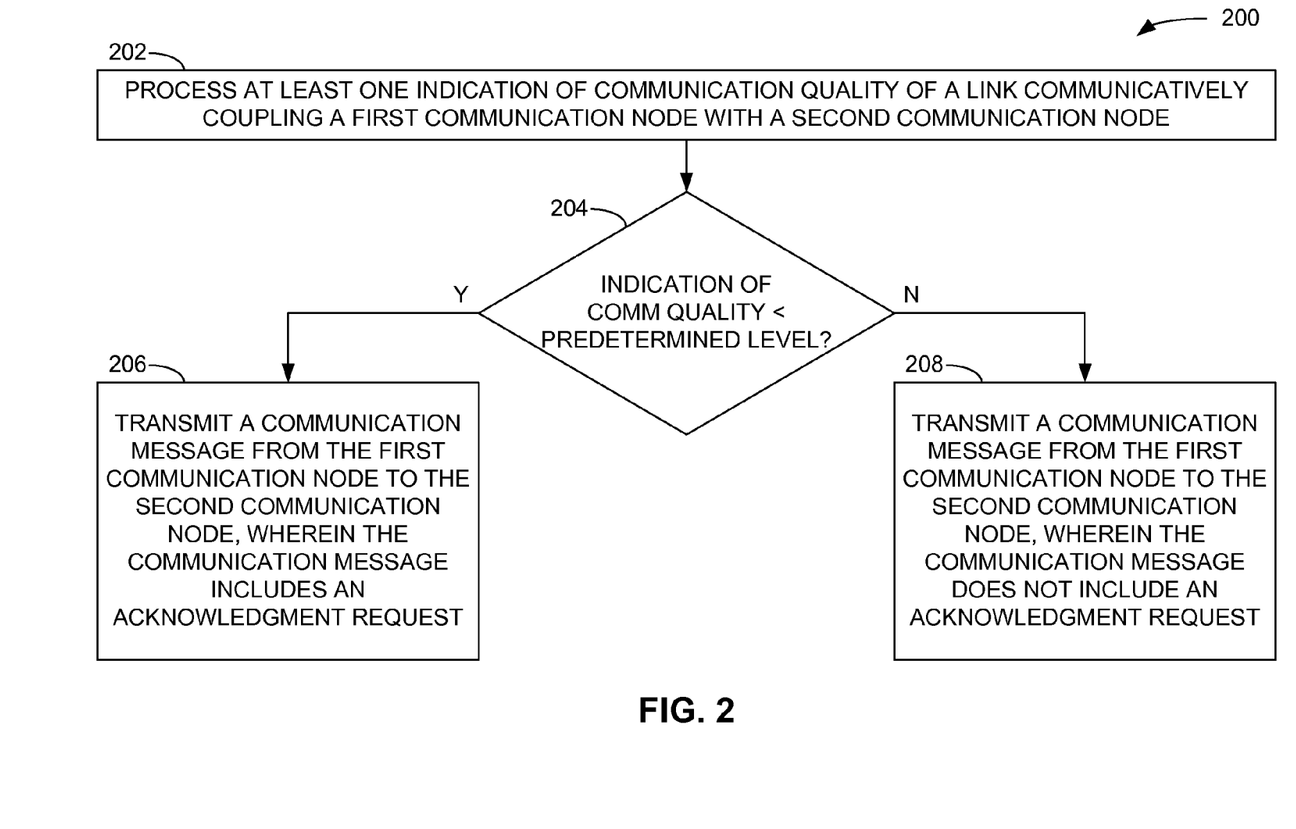
FIG. 2 is a flow diagram of a method according to an embodiment of the invention of selectively employing acknowledgment in the communication system of FIG. 1.

FIG. 2 presents a method 200 according to an embodiment of the invention of selectively employing acknowledgment in a communication system, such as the communication system 100 presented in FIG. 1. In the method 200, either or both of the first communication node 102 or the second communication node 104 processes at least one indication of communication quality of a link 103 communicatively coupling the first communication node 102 with the second communication node 104 (operation 202). In cases in which the first communication node 102 processes the at least one indication of communication quality, the indication may be received into the first communication node 102 from an external device or system, such as the second communication node 104, or may be produced internally within the first communication node 102 based on communications received from other devices or systems, such as the second communication node 104.

At some point after processing the at least one indication of communication quality (operation 202), the first communication node 102 transmits a communication message 112 over the communication link 103 to the second communication node 104 (operations 206, 208). More specifically, if the processing of the at least one indication signifies that the communication quality of the communication link 103 is below some predetermined level (operation 204), the message 112 includes an acknowledgment request (operation 206). If, instead, the processing of the at least one indication signifies that the communication quality of the link 103 at least attains the predetermined level (operation 204), the message 112 does not include the acknowledgment request (operation 208). For those messages 112 which include the acknowledgment request (via operation 206) and are received successfully at the second communication node 104, the second node 104 transmits a corresponding message acknowledgment 114 to the first communication node 102. In another embodiment, a computer-readable storage medium may have encoded thereon instructions for a processor or other control circuitry of the first communication node 102 of FIG. 1 to implement the method 200.

As a result of employing the method 200 in at least some embodiments, the number of acknowledgments requested and ultimately received by the first communication node 102 may be significantly reduced during periods of time in which the quality of communications between the two nodes 102, 104 is high. Such a reduction in the use of acknowledgment messages or signals is likely to result in more efficient use of the bandwidth available for communications between the two nodes 102, 104. Moreover, using the method 200, a receiver of the first communication node 102 remains enabled for fewer periods of time awaiting acknowledgment messages from the second communication node 104 compared to protocols in which an acknowledgment is expected for every message. Therefore, the receiver of the first communication node 102 spends less overall time in an activated state, thereby reducing the amount of electrical power consumed by the first communication node 102. Additional advantages may be recognized from the various implementations of the invention discussed in greater detail below.

Figure 3:
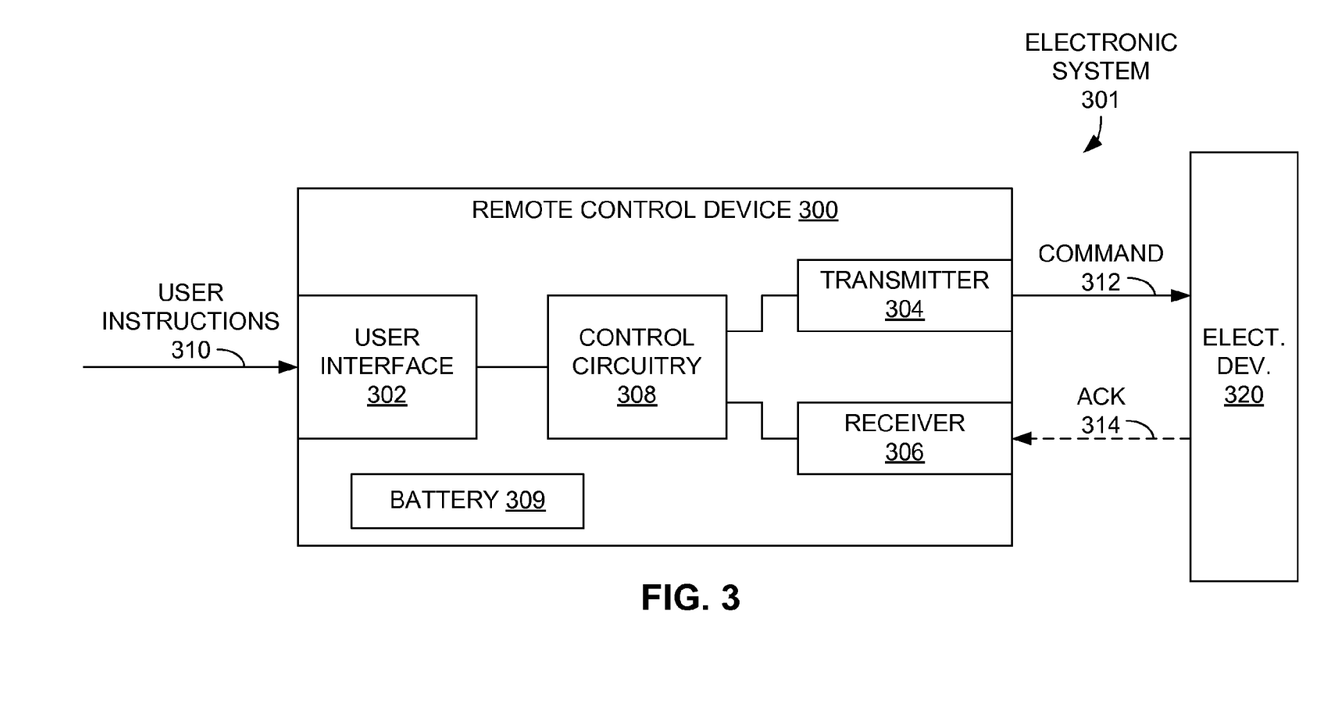
FIG. 3 is a block diagram of a remote control device operating as a communication node according to an embodiment of the invention.

FIG. 3 provides a block diagram of a remote control device 300 for controlling an electronic device 320 of an electronic system 301. In this particular system 301, the remote control device 300 employs radio frequency (RF) signals to issue commands 312 to, and receive associated acknowledgments 314 from, the electronic device 320, although other wireless communication technologies, such as infrared (IR) signals, may be used in other examples. The electronic device 320 may send commands and receive acknowledgments from the remote control device 300 in some implementations. As a result, the electronic device 320 may employ some embodiment of selectively requesting acknowledgments in a fashion similar to that used by the remote control device 300, as is discussed in greater detail below. Examples of the electronic device 320 include, but are not limited to, televisions, video monitors, television receivers or "set-top boxes", Compact Disc (CD) and Digital Versatile Disk (DVD) players, standalone digital video recorders (DVRs), audio receivers, and video gaming systems. Other electronic devices 320, such as those not normally associated with a home entertainment system, may be controlled via the remote control device 300 in other implementations.

As shown in FIG. 3, the remote control device 300 includes a user interface 302, a transmitter 304, a receiver 306, control circuitry 308, and a battery 309 for supplying power to the other components of the remote control device 300. Other components, such as a remote control body for housing the other components, may also be included in the remote control device 300, but such components are not explicitly shown or discussed herein to facilitate the following discussion.

The user interface 302 is configured to receive user instructions that are translated into the commands 312 transmitted by the transmitter 304 to control the electronic device 320. Any one or more components possibly provided for user input, including, but not limited to, user-actuated keys, buttons, switches, joysticks, levers, touch screens, gyroscopes, and accelerometers, may be incorporated into the user interface 302.

The transmitter 304 is configured to transmit the commands 312 by way of RF signals to the corresponding electronic device 320 to be controlled. Similarly, the receiver 306 is configured to receive acknowledgments 314 via RF signals transmitted by the electronic device 320 in response to those commands 312 that request such an acknowledgment and that were successfully received at the electronic device 320. As mentioned above, the transmitter 304 and the receiver 306 may be configured to employ other types of signals, such as IR or optical signals. In some embodiments, the transmitter 304 and the receiver 306 are incorporated within a single transceiver component. In one particular implementation, the commands 312 adhere to the communication protocol provided in the IEEE (Institute of Electrical and Electronics Engineers) 802.15.4 standard for wireless personal area networks (WPANs). One specific standard employing a version of this protocol currently being utilized is the ZigBee® Alliance RF4CE communication standard, although other communication protocols or standards may provide a basis for communication between the remote control device 300 and the electronic device 320.

The control circuitry 308 is coupled with the user interface 302, the transmitter 304, the receiver 306, and the battery 309. The control circuitry 308 may include one or more processors, such as a microprocessor, microcontroller, or digital signal processor (DSP), configured to execute instructions directing the processor to perform the functions discussed more fully below. The control circuitry 308 may also include memory or data storage adapted to contain such instructions. In another implementation, the control circuitry 308 may be strictly hardware-based logic, or may include a combination of hardware, firmware, and/or software elements.

In operation, the control circuitry 308 is configured to selectively determine for which commands 312 to request a corresponding acknowledgment 314 from the electronic device 320. In one example, the control circuitry 308 signifies which of the commands 312 are to be acknowledged by way of a control bit or other data incorporated within the command 312, such as within a header or other overhead data of the command 312. One example of such a header is provided in commands formatted according to the IEEE 802.15.4 standard mentioned above. Other methods of notifying the electronic device 320 of a request to provide an acknowledgment, such as by way of a separate signal or message temporally or logically associated with the command 312 to be acknowledged, may be used in alternative implementations.

In one embodiment, the decision as to whether to request an acknowledgment 314 is predicated upon at least one indication regarding the quality of the communication channel or connection between the remote control device 300 and the electronic device 320 utilized by the transmitter 304 and the receiver 306. In one embodiment, the indication may be some quantitative measure or value of a particular characteristic of a command 312 message. Any quantifiable characteristic associated with communication quality, including, but not limited to, signal energy or strength, signal-to-noise ratio (SNR), and percentage of unsuccessfully received messages, may be employed as an indication of communication quality. Specific examples of such data are noted in the IEEE 802.15.4 specification, which describes the measurement of receiver energy detection ("receiver ED"), which is an estimate of the signal power in a received command 312. Another example from that same specification is the link quality indicator ("LQI"), which may employ either or both of the received energy level and the SNR associated with a received command 312.

In one implementation, the control circuitry 308 may receive one or more of the indications of communication quality by way of at least one previous acknowledgment 314 received from the electronic device 320 in response to a preceding command 312 from the remote control device 300. More specifically, the acknowledgment 314 may include the indication of communication quality related to reception of the command 312 causing the acknowledgment 314. Other messages or signals, such as status messages, that include a value quantifying some characteristic of one or more received commands 312 may be transferred from the electronic device 320 to the remote control device 300 in other embodiments.

According to another example, the control circuitry 308 may generate one or more indications of communication quality between the electronic device 320 and the remote control device 300. For instance, the control circuitry 308 may measure or generate signal strength, SNR, or message transmission failure rate data for one or more messages transmitted from the electronic device 320 and received at the remote control device 300, such as the acknowledgments 314. In some cases, the quality of communications transmitted by the electronic device 320 may be somewhat different from the quality of transmissions from the remote control device 300. However, the quality of transmissions from the electronic device 320 may serve as a proxy for the quality of transmissions from the remote control device 300.

The control circuitry 308 may then process one or more such received or generated communication quality indications to determine whether a command 312 should include an acknowledgment request. In one implementation, the control circuitry 308 may process a most recent number of multiple quality indications to generate a current communication quality state. For example, the control circuitry 308 may calculate an average of a most recent number of quality values. The average may then be updated with each new quality indication received or generated by dropping the oldest of the quality indications in the average, adding in the most recent indication, and recalculating the average in a rolling manner to generate the current communication quality state. Many other methods of generating the current quality state from one or more individual quality indications may be used in other examples.

While the control circuitry 308 continues to maintain the current communication quality state for the remote control device 308, the control circuitry 308 may receive user directions via the user interface 302 to issue the commands 312 to the electronic device 320. In one implementation, the control circuitry 308 compares the current quality state against some predetermined level or threshold. If the current quality state meets or exceeds the threshold, the control circuitry 308 transmits the commands 312 without requesting that an acknowledgment be returned. Otherwise, with the current quality state falling below such a threshold, the control circuitry 308 requests that an acknowledgment 314 of the command 312 be returned by the electronic device 320 to ensure the device 320 received the command 312 successfully. In one implementation, each command 312 for which an acknowledgment 314 is to be returned includes a bit or other data structure within the command 312 itself to indicate if that command 312 is to be acknowledged. Such a bit may be employed in a header or other overhead information incorporated within the command 312, such as what is available in the IEEE 802.15.4 specification, mentioned above.

Figure 4:
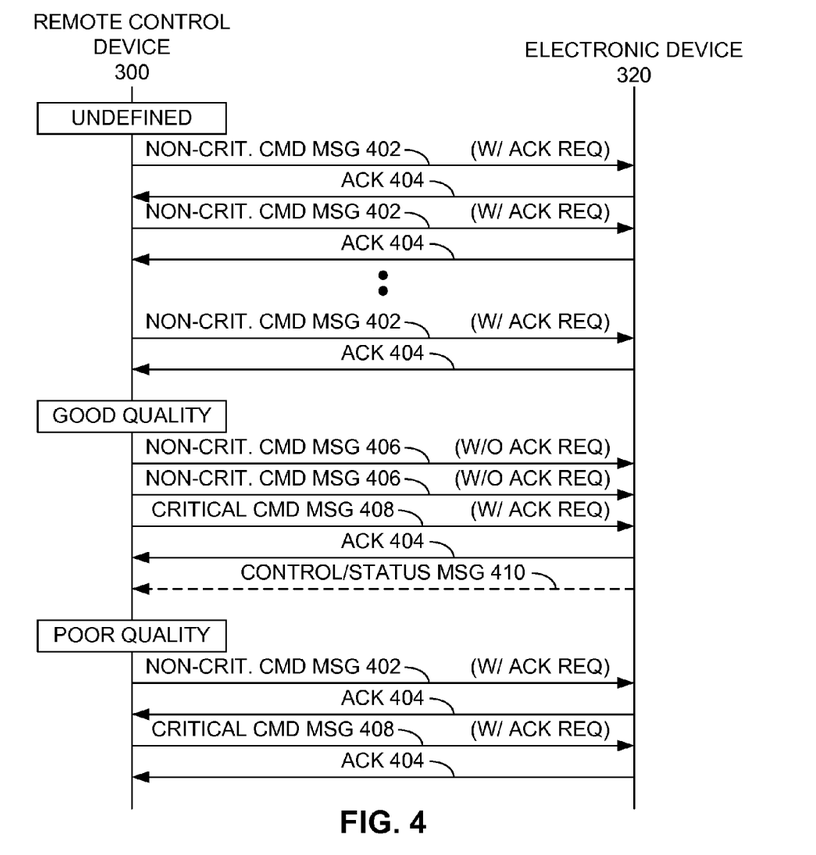
FIG. 4 is a communication diagram displaying example message transmissions between the remote control device of FIG. 3 and an associated electronic device to be controlled according to an embodiment of the invention.

FIG. 4 provides a communication diagram that diagrammatically represents communications between the remote control device 300 and the electronic device 320 according to an embodiment of the invention. In this particular implementation, some of the commands 314 transmitted may be either "critical" or "non-critical", depending on their effect on the electronic device 320, the perception of a user, and/or other criteria. Generally speaking, the control circuitry 308 would request acknowledgment for a non-critical command only if the current quality state of the communication link between the remote control device 300 and the electronic device 320 rests below some threshold, indicating that the quality was "poor", rather than "good". For critical commands, the control circuitry 308 may always request acknowledgment to ensure their safe reception at the electronic device 320.

As shown in FIG. 4, the current communication quality state maintained within the remote control device 300 may be undefined initially due to a lack of sufficient information regarding communication quality between the remote control 300 and the electronic device 320. In an undefined state, the control circuitry 308 may respond either as if the current quality state were below the comparison threshold, or above that threshold, depending on the embodiment. FIG. 4 provides an example in which an undefined current quality state is treated as poor, thus causing the control circuitry 308 to request acknowledgment for each non-critical command message 402 with an acknowledgment request. As a result, the electronic device 320 responds to each non-critical command message 402 requesting acknowledgment with an acknowledgment message 404.

While transmitting the command messages 402 and receiving the associated acknowledgment messages 404, the control circuitry 308 receives or generates indications regarding the quality of communications between the remote control device 300 and the electronic device 320. For example, the control circuitry 308 may receive values regarding signal strength, link or message quality, transmission error rates, and/or other indications related to the quality of each of the command messages 402 transmitted to the electronic device 320. These indications may be generated and communicated from the electronic device 320, such as by way of data incorporated into each acknowledgment message 404. Under such conditions, each acknowledgment message 404 would carry at least one quality indication for its related command message 402. The electronic device 320 may employ other methods, such as out-of-band signals or other forms of data, for relaying the quality indicators to the remote control device 300 in other arrangements.

In other embodiments, the control circuitry 308 may generate some indications of communication quality between the remote control device 300 and the electronic device 320 by analyzing one or more characteristics of the received acknowledgment messages 404, such as received signal strength, link or message quality, reception error rates, and so on. As discussed above, while such indications may not directly indicate how well the electronic device 320 is receiving the command messages 402, such information may serve as a useful proxy for that information.

In another example, the control circuitry 308 may track the number of command messages 402 and associated retries that were not received successfully at the electronic device 320 by counting the number of expected acknowledgment messages 404 that were not received at the remote control device 300.

Based on any of these communication quality indications, or some combination thereof, the control circuitry 308 may then generate a quality metric to compare against some quality threshold to determine the current quality state of communications between the remote control device 300 and the electronic device 320. For example, the control circuitry 308 may average some number of the latest quality indications received or generated to arrive at the quality metric. More specifically, the metric may be a straight average of the most recent signal strength or energy measurements, or of some other quality indicator. In other examples, the metric may be a weighted average, in which more recent quality indications are more heavily weighted in the average than older indications. In another embodiment, the control circuitry 308 may track an overall percentage of unacknowledged command messages 402 over some predetermined number of command messages 402 transmitted to the electronic device 320. Other methods of generating a quality metric to be compared against the threshold may be incorporated into the control circuitry 308 of the remote control device 300. In yet other implementations, the electronic device 320 or another external device may be responsible for generating the quality metric and providing the metric to the control circuitry 308 for comparison with the quality threshold.

Depending upon the comparison of the quality metric and the threshold, the control circuitry 308 determines the current communication quality state that is employed to decide whether particular command messages are to be acknowledged by the electronic device 320. As illustrated in FIG. 4, the control circuitry 308 determines that the current communication quality is "good" after some initial quality indications have been processed. In response, non-critical command messages 406 transmitted during the good quality state in response to various user instructions 310 do not include acknowledgment requests, resulting in no acknowledgment messages being returned from the electronic device 320. Oppositely, more critical messages 408 will each include an acknowledgment request, typically resulting in an associated acknowledgment message 404 being returned in response. As discussed above, these acknowledgments 404 may include quality indications regarding their corresponding command messages 408. In another example, the electronic device 320 may transmit control/status messages 410 containing the quality indications to the remote control device 300.

In some embodiments, during periods of time when the control circuitry 308 has no outstanding acknowledgment messages 404 to receive due to issuing command messages 402 that do not include acknowledgment requests, the control circuitry 308 may disable or deactivate the receiver 306 of the remote control device 300 to save what electrical energy would otherwise be necessary to energize the receiver 306 while awaiting an expected acknowledgment message 404. Therefore, as a result of issuing commands 406 that do not include acknowledgment requests, overall energy consumption of the remote control device 300 may be reduced. This reduction in energy consumption thus either extends the usable life of the battery 309 (in the case of a non-rechargeable battery 309), or increases the typical amount of usage time between charges (in the case of a rechargeable batter 309).

As a result of ongoing processing of the quality indications in the control circuitry 308 of the remote control device 300, the generated quality metric may fall below the comparison threshold or value, thus causing the control circuitry 308 to classify the current communication quality state as "poor". While in that state, the control circuitry 308 includes acknowledgment requests in both non-critical messages 402 and critical messages 408 so that proper retrying of transmission of the messages 402, 408 may occur when the messages 402, 408 have not been successfully received at the electronic device 320. For each such command message 402, 408 that has been received without error, the electronic device 320 returns a corresponding acknowledgment message 404 to the remote control device 300.

The determination as to which messages are critical and which are non-critical may be specific to the particular environment or system in which the remote control device 300 operates. In one example, a critical command message 408 may be a command message that would either be annoying to the user if not received and executed at the electronic device 320, would need to be verified as being received at the electronic device 320 before proceeding with some other function, or would otherwise benefit from the verification of command reception at the electronic device 320. For example, a command message 408 initiated by a user to power on or off the electronic device 320 may be considered a critical command 408 in some cases. The same may be true of commands 408 that change a television channel being viewed, or commands 408 to access a menu. Other examples of critical command messages 408 initiated via a user instruction 310 may also exist.

Other commands 408 issued by the remote control device 300 that are not explicitly initiated by a user instruction 310 may also be considered critical. For instance, a command message 408 requesting an update to firmware resident within the remote control 300 may be thought of as critical. Another would be a command 408 causing the electronic device 320 to store important data collected by either the remote control device 300 or the electronic device 320.

Possible non-critical commands 402, 406 may include, for example, any command that, in and of itself, may cause a minor change in the status of the electronic device 320 from the perspective of the user. An example of such a non-critical command 402, 406 may include a command to increase or decrease the audio volume exhibited by the electronic device 320 by some small amount. Another example may be a command causing an incremental movement of a cursor displayed via the electronic device 320 in some user-specified direction. Such an input may be caused by a user tapping a directional button or contacting a touch screen of the remote control device 300. Generally speaking, such commands are usually sent in multiples in quick succession by the user, so if only one or a few of the commands 402, 406 are not successfully received at the electronic device 320, the user initiating the commands 402, 406 is not likely to notice.

Figure 5:
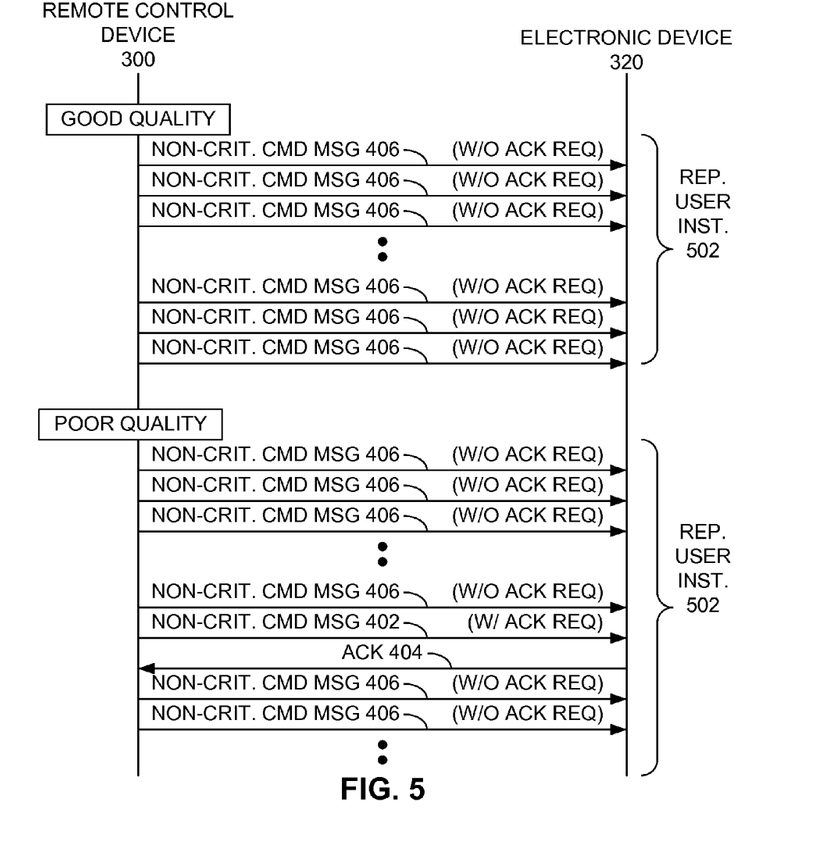
FIG. 5 is a communication diagram displaying more example message transmissions between the remote control device of FIG. 3 and the associated electronic device according to another embodiment of the invention.

In another embodiment, when transmitting a series of these repetitive commands 402, 406, the control circuitry 308 of the remote control device 300 may request acknowledgment for less than every command 402, 406 in the series. As a consequence, the control circuitry 308 would receive feedback that at least some of the commands 402, 406 are being received successfully at the electronic device 300. In one embodiment depicted in FIG. 5, the control circuitry 308 transmits a series of non-critical command messages 402 in response to a repetitive user instruction 502, such as when a user continuously presses a "volume-up" or "volume-down" button of the user interface 302 of the remote control device 300. In the example of FIG. 5, the user instruction 502 is issued once during the good communication quality state, and once during the poor communication quality state.

During the good quality state, the control circuitry 308 issues each of the commands as a non-critical command 406 without an acknowledgment request. Thus, during the entire series of command messages 406, no acknowledgment messages 404 are expected at the remote control device 300. As a result, the control circuitry 308 can deactivate the receiver 306 during that entire period of time. In arrangements in which the transmitter 304 and the receiver 306 are combined as a single transceiver, the transceiver would be either in a transmitting mode or in a low-power inactive state during periods of time in which acknowledgment messages are not requested. As a result of either embodiment, power consumption of the remote control device 300 is reduced, thus conserving the stored electrical charge of the battery 309.

In the case of the repetitive instruction 502 being issued during the poor quality state, the control circuitry 308 may choose to include an acknowledgment request in less than all of the non-critical command messages 402, such as, for example, every fifth or tenth command message 406, to receive acknowledgment that at least some of the commands 402, 406 are being received. Under this scenario, the control circuitry 308 would only need to activate the receiver 304 after the commands 402 that include an acknowledgment request, and deactivate the receiver 304 after the acknowledgment 404 is received.

In another embodiment, such intermittent acknowledgment requests may be implemented while in the good communication quality state, while such requests may be included in every command message 402 when in the poor quality state. This embodiment may be employed in cases in which the repetitive command 502 is of more importance or criticality that an audio volume modification command or a cursor movement command. An example of one possible repetitive command benefiting from such treatment may be a repetitive "channel-up" or "channel-down" command.

At least some embodiments as described herein thus provide systems and methods whereby command or message acknowledgment is employed selectively to ensure the successful transfer of more important messages while conserving the amount of communication bandwidth being consumed. Additionally, the amount of time consumed to transmit each command may be significantly reduced due to less time being expended awaiting acknowledgment messages, especially in situations in which a single communication channel is utilized by the two communicating nodes. Further, the amount of power consumed by at least one of the communication devices involved may be limited by reducing the amount of time a receiver component is actively awaiting an acknowledgment message or signal. Moreover, in some environments in which several different communication nodes are within communication range of each other, a reduction in the total amount of communication traffic resulting from fewer acknowledgments being transmitted may reduce the probability of command collisions, thereby resulting in fewer command delays due to communication channel congestion.

While several embodiments of the invention have been discussed herein, other implementations encompassed by the scope of the invention are possible. For example, while various embodiments have been described largely within the context of remote control devices and associated electronic devices for entertainment systems, other electronic devices or communication nodes, including but not limited to general-purpose and special-purpose computer systems, mobile communication devices, and personal digital assistants (PDAs), may incorporate various aspects of the functionality described above to similar effect. Also, while the use of the IEEE 802.15.4 specification is mentioned herein, the use of other wired or wireless communication protocols employing an acknowledgment scheme, such as Bluetooth®, may benefit from application of the particular principles described above. In addition, aspects of one embodiment disclosed herein may be combined with those of alternative embodiments to create further implementations of the present invention. Therefore, while the present invention has been described in the context of specific embodiments, such descriptions are provided for illustration and not limitation. Accordingly, the proper scope of the present invention is delimited only by the following claims and their equivalents.

What is claimed is:

1. A method of selectively employing acknowledgment in a communication system, the method comprising:
   processing at least one indication of communication quality of a link communicatively coupling the first communication node with a second communication node by averaging a most recent number of the at least one indication of communication quality;
   after processing the at least one indication, transmitting a plurality of messages from the first communication node over the link to the second communication node;
   wherein each of the messages includes an acknowledgment request if the average of the most recent number of the at least one indication signifies that the communication quality of the link is below a predetermined level; and
   wherein only one of the messages includes the acknowledgment request if the average of the most recent number of the at least one indication signifies that the communication quality of the link at least attains the predetermined level.

2. The method of claim 1, further comprising:
   receiving the at least one indication from the second communication node into the first communication node;
   wherein the at least one indication comprises at least one indication as to communication quality related to a previous message received at the second communication node from the first communication node over the link.

3. The method of claim 2, wherein:
   an acknowledgment received at the first communication node in response to the previous message transmitted from the first communication node over the link to the second communication node comprises the at least one indication.

4. The method of claim 1, further comprising:
   generating the at least one indication within the first communication node;
   wherein the at least one indication comprises at least one indication as to communication quality related to at least one previous message received at the first communication node from the second communication node over the link.

5. The method of claim 4, wherein:
   the at least one previous message comprises an acknowledgment of a preceding message received at the second communication node from the first communication node over the link.

6. The method of claim 1, wherein:
   processing the at least one indication of communication quality occurs within the first communication node.

7. The method of claim 1, wherein:
   the link comprises a wireless communication link; and
   the at least one indication comprises a receiver energy detection indicator.

8. The method of claim 1, wherein:
   the link comprises a wireless communication link; and
   the at least one indication comprises a link quality indicator.

9. The method of claim 1, further comprising:
   activating a receiver of the first communication node after the transmission of the message if the message includes the acknowledgment request; and
   after activating the receiver, deactivating the receiver after an acknowledgment is received at the first communication node in response to the acknowledgment request.

10. The method of claim 1, wherein:
the transmitted message belongs to a first class of messages; and
each transmitted message of a second class of messages includes an acknowledgment request regardless of the processing of the at least one indication of communication quality.

11. A communication node, comprising:
a transmitter configured to transmit wireless signals to a second communication node;
a receiver configured to receive wireless signals from the second communication node; and
a control circuitry configured to:
repeatedly process at least one value indicating communication quality between the communication node and a second communication node;
average a most recent number of the at least one value indicating communication quality; transmit a plurality of messages from the transmitter to the second communication node;
wherein each of the plurality of messages includes an acknowledgment request if the average of the at least one value signifies that the communication quality is below a predetermined level; and
wherein only at least some of the plurality of messages do not include the acknowledgment request if the average of the at least one value signifies that the communication quality at least attains the predetermined level.

12. The communication node of claim 11, wherein:
the control circuitry is configured to receive the at least one value from the second communication node via the receiver.

13. The communication node of claim 11, wherein:
the control circuitry is configured to generate the at least one value based on at least one message received from the second communication node via the receiver.

14. The communication node of claim 11, wherein:
the at least one value comprises at least one of a received signal strength indicator, a link quality indicator, a signal-to-noise ratio, and a failed message percentage.

15. The communication node of claim 11, wherein:
the control circuitry is configured to activate the receiver after the message is transmitted via the transmitter when the message includes the acknowledgment request, and to deactivate the receiver after the requested acknowledgment is received.

16. A method of selectively employing acknowledgment in a communication system, the method comprising:
processing at least one indication of communication quality of a link communicatively coupling the first communication node with a second communication node by averaging a most recent number of the at least one indication of communication quality;
after processing the at least one indication, transmitting a plurality of messages from the first communication node over the link to the second communication node;
wherein exactly one of the messages includes an acknowledgment request if the average of the most recent number of the at least one indication signifies that the communication quality of the link is below a predetermined level; and
wherein none of the message includes the acknowledgment request if the average of the most recent number of the at least one indication signifies that the communication quality of the link at least attains the predetermined level.

17. The method of claim 16, further comprising:
generating the at least one indication within the first communication node;
wherein the at least one indication comprises at least one indication as to communication quality related to at least one previous message received at the first communication node from the second communication node over the link.

18. The method of claim 17, wherein:
the at least one previous message comprises an acknowledgment of a preceding message received at the second communication node from the first communication node over the link.

19. The method of claim 16, further comprising:
activating a receiver of the first communication node after the transmission of the message if the message includes the acknowledgment request; and
after activating the receiver, deactivating the receiver after an acknowledgment is received at the first communication node in response to the acknowledgment request.

* * * * *